No. 665,827. Patented Jan. 8, 1901.
J. L. CREVELING.
MANUFACTURE OF STORAGE BATTERY PLATES.
(Application filed May 23, 1900.)
(No Model.) 2 Sheets—Sheet 1.
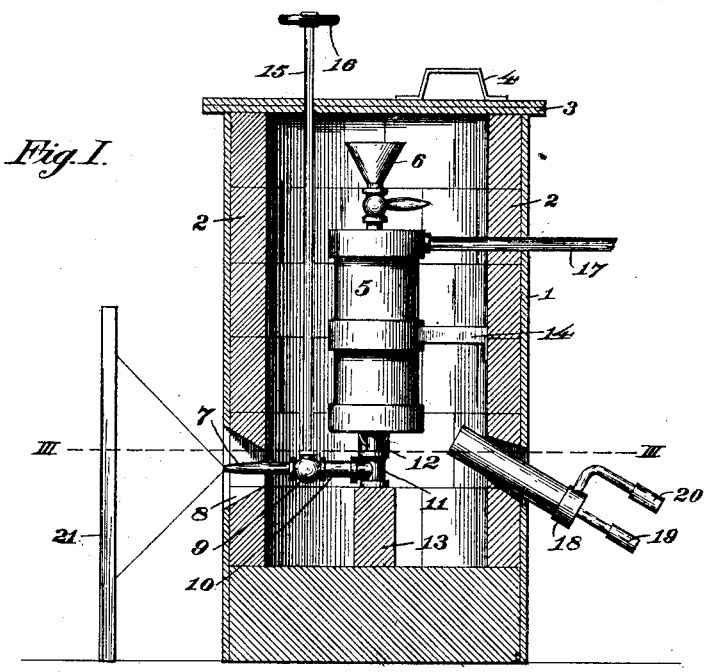
Fig. I.
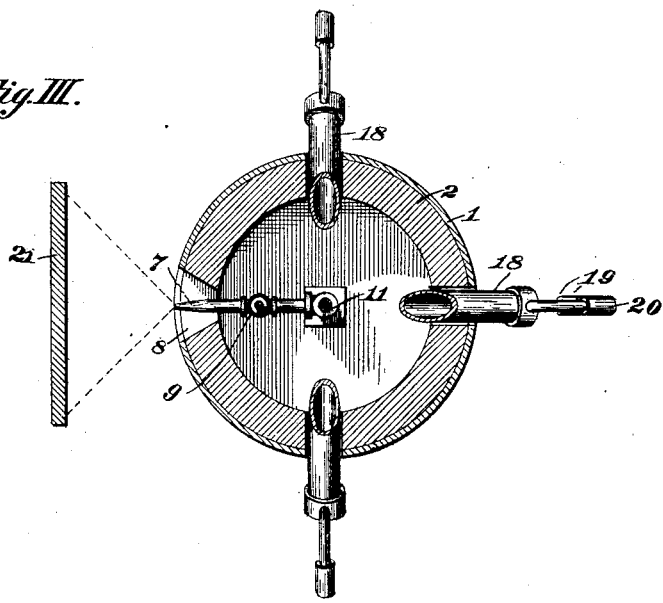
Fig. III.
Witnesses
H. S. Austin
Karl Daniel
Inventor:
John L. Creveling
By Joseph L. Atkins
Attorney No. 665,827. Patented Jan. 8, 1901.
J. L. CREVELING.
MANUFACTURE OF STORAGE BATTERY PLATES.
(Application filed May 23, 1900.)
(No Model.) 2 Sheets—Sheet 2.
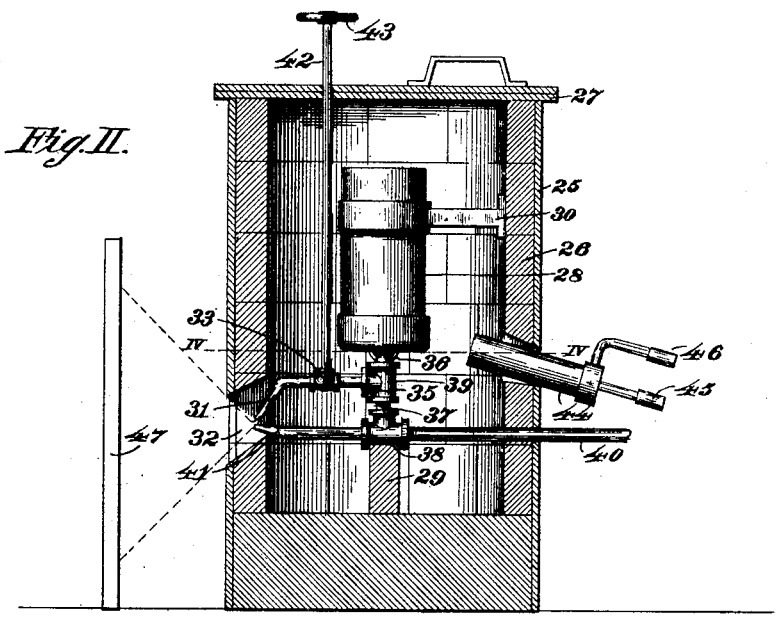
Fig. II.
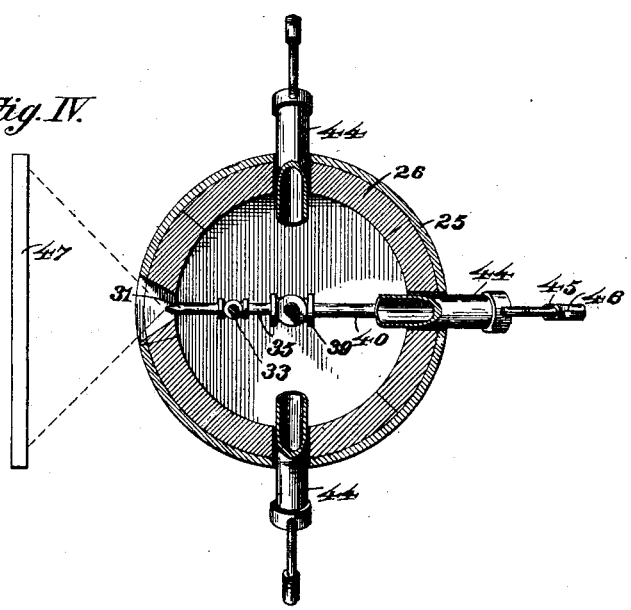
Fig. IV.

UNITED STATES PATENT OFFICE.

JOHN L. CREVELING, OF NEW YORK, N. Y.

MANUFACTURE OF STORAGE-BATTERY PLATES.

SPECIFICATION forming part of Letters Patent No. 665,827, dated January 8, 1901.

Application filed May 23, 1900. Serial No. 17,701. (No specimens.)

*To all whom it may concern:*

Be it known that I, JOHN L. CREVELING, of New York, in the county of New York, State of New York, have invented certain new and useful Improvements in the Manufacture of Storage-Battery Plates, of which the following is a complete specification, reference being had to the accompanying drawings.

The object of my invention is to produce by an improved method a metallic plate, as of lead, which on account of its extreme porosity possesses in proportion to its volume a very extensive surface that renders it effectual as a storage-battery plate.

Heretofore plates of very porous lead have been produced by placing ordinary sheets of lead in a solution of sulfuric acid and passing currents of electricity through them alternately in opposite directions. This operation having been repeated several times, the lead plates subjected to the treatment become extremely porous, owing to electrolytic action; but after they become by repeated treatments, as described, sufficiently porous to have a considerable capacity they are found to be practically rotten and too weak for ordinary commercial use. Moreover, this process is very expensive on account of the amount of electric current and the time required for the formation of the plates.

Another method of producing porous plates is to utilize the crystals of lead, skimming them off the crucible while the lead therein is in a molten condition.

Still another method is to mix salt or similar substance with molten lead, then cast it into a plate, and afterward dissolve out the salt or similar substance.

By my invention it is proposed to produce a plate having requisite porosity without the objectionable qualities of plates produced by the previous methods above referred to and that by the employment of a process comparatively economical and expeditious. Besides, as will hereinafter more fully appear, plates prepared by my method possess distinctive differences over plates produced by other methods in that the exposed surface of the metal throughout the porous mass is more or less oxidized or partly "formed"—that is to say, made ready for use as a storage-battery plate.

In practicing my method it is possible to employ a wide variety of apparatus for the purpose, from among which I have selected such forms as will serve sufficiently and clearly to illustrate the principle of my invention.

In the accompanying drawings, Figure I illustrates, partially in section and partially in elevation, one form of apparatus adapted to be used in the practice of my invention. Fig. II illustrates in like manner a modified form of apparatus. Fig. III is a section on the lines III III of Fig. I, and Fig. IV a section on the line IV IV of Fig. II.

Referring to the numerals on Figs. I and III, 1 thereon represents the exterior shell of a furnace, which may be made, for example, of sheet-iron. 2 indicates a suitable lining for the furnace, as of fire-brick, and 3 an asbestos-lined cover adapted to be manipulated as by aid of a handle 4. 5 represents a closed receptacle for molten metal, as lead. It may be of any suitable shape and dimensions and is preferably provided with a cock-controlled funnel 6, communicating with its interior near its upper part. 7 indicates a nozzle communicating with the interior of the receptacle 5 and extending through an aperture 8 in a wall of the furnace. The means of communication between the nozzle and the receptacle 5 illustrated are a valve-case 9, a nipple 10, a T-fitting 11, and a second nipple 12. The lower end of the T-fitting 11 is closed or plugged and may rest upon a fire-brick 13 as a support, a brace 14 serving to aid in supporting the receptacle securely upon said base. 15 indicates an elongated valve-stem which communicates at one end with a valve within the shell 9 and projecting beyond the exterior of the furnace-wall, as through the cover 3, terminates in a hand-wheel 16, by which the valve may be manipulated from the exterior of the furnace. 17 indicates a fluid-pressure-supply pipe communicating, for example, with a source of compressed air. (Not illustrated.) 18 indicates each of a series of blowpipes adapted to afford means for keeping the receptacle 5 and its contents at a proper temperature, the employment of a plurality of such blowpipes being preferred. The blowpipe may be supplied with air, as through the tube 19, and with gas, as through a tube 20. 21 represents a collector against which the nozzle 7 discharges and upon whose surface the porous plate produced by the practice of my method is formed. The collector may be in the form of a board or plate or box, the form illustrated being shown merely by way of illustration.

Referring now to the numerals on Figs. II and IV of the drawings, 25 indicates the outer shell, and 26 the inner lining, as of fire-brick, of a suitable furnace. 27 indicates an asbestos-lined cover, and 28 a receptacle for molten lead, that is supported within the furnace, as upon a brick support 29 and by a brace 30. 31 indicates a nozzle communicating with the interior of the receptacle 28 and with an aperture 32 in a wall of the furnace. The means of communication illustrated between the nozzle and the receptacle are a valve-shell 33, a T-fitting 39, and nipples 35 and 36. The lower end of the T-fitting is closed by a solid block 37, which screwing into a T-fitting 38, that rests upon the brick 29, serves to sustain the weight of the receptacle 28. 40 indicates a pipe communicating with a source of fluid-pressure supply (not illustrated) and which passing through or incorporated with the fitting 38 terminates in a nozzle 41, located in juxtaposition to the nozzle 31. 42 indicates a valve-stem operatively communicating with a valve within the shell 33 and which extending beyond the exterior of the furnace, as through the cover 27, terminates in a hand-wheel 43. 44 indicates a blowpipe, preferably one of a series of blowpipes, which is supplied as through an air-pipe 45 and a gas-pipe 46 and is adapted to support a flame in proximity to the receptacle for heating the contents thereof. 47 indicates a collector against which the material from the nozzle 31, deflected by the air-blast nozzle 41, is discharged and upon whose surface the porous plate produced by the practice of my method is formed. The collector may be in the form of a board, plate, or box, the form illustrated being shown merely by way of example.

In practicing my method through the employment of the apparatus illustrated lead is supplied to the receptacle 5 or 28, the valve within the shell 9 or 33 being closed. By the aid of the blowpipe or blowpipes 18 or 44 the metal within the receptacle is raised to or maintained at a required temperature. The valve within the shell 9 or 33 is then opened and fluid, as air, under pressure is supplied through the pipe 17 or 40. If the apparatus shown in Figs. I and III be used, the cock of the funnel 6 being closed, the air forces a jet of very finely divided lead from the nozzle 7 against the collector 21. If, on the other hand, the apparatus shown in Figs. II and IV be employed, the operation is as follows: Issuing from the nozzle at a point adjacent to the nozzle 31 the air-blast sprays the molten metal from the nozzle 31 against the collector 47, where it is deposited in a porous sheet.

If in place of a flat collector a box be employed, the box may be filled with the sprayed metal, which afterward may be sawed into pieces of required size and fitted into suitable forms for use in a storage battery. The fine particles or globules which form the spray that issues from the nozzle become welded against each other or united when they strike the surface of the collector in such manner as to form a strong and porous plate. It is also found, as above stated, that this plate so produced is partly formed or rendered ready for use as a storage-battery plate. This is probably due to the fact that the particles of lead in its finely-divided state come severally in contact with the air in passing from the nozzle to the surface of the collector and are thereby partially oxidized. This fact appears to account for the particles welding up into a porous mass instead of making a plate of solid metal. So far, however, from this being objectionable, it is a positive gain, inasmuch as it not only produces a plate of required porosity, but saves more or less of the process of forming or of preparing the plate for use in a storage battery, which would otherwise have to be carried out electrically.

The process of oxidation is carried out as follows: The molten metal as it issues from the nozzle being caused to pass through an oxidizing-flame supplied from the blowpipes, it will be perceived that the oxidation of the particles composing the spray of molten lead is effected. It is desirable also to provide means for regulating the degree of oxidation that may be reached. Such means consist in the location of the heaters or blowpipes with respect to the discharge end of the nozzle and control of the gas and air supply to blowpipes. By allowing the oxidizing-flame from the blowpipes to come in close proximity with the discharge end of the nozzle or even so as to touch the jet or metal as it issues from the nozzle any desired degree of oxidation may be reached. To make this clearer, it may be stated that when a little gas and air pressure be given the blowpipes their jets will merely curl up around the nozzles, so as to help the flow of lead, or if sufficient pressure be given that the flame may be forced through the orifice 8 or 32, so as to mingle with the lead as it is being sprayed from the nozzle. With this explanation it can readily be seen that by varying the gas and air pressure upon the pipes or the distance between the nozzle and the orifice the degree of heat, and thereby the degree of oxidation of the particles that issue from the nozzle, may be regulated. It is obvious that if sufficient flame be sent out through the orifice 8 or 32, together with the molten lead, the lead may be entirely oxidized owing to its finely-divided condition when coming into contact with the flame and atmospheric air.

What I claim is—

1. The process of producing a porous plate, which consists in spraying molten metal against a collector, and causing the sprayed metal, before it reaches the collector, to pass through an oxidizing-flame.

2. The process of producing a porous plate, which consists in spraying molten metal through an oxidizing-flame against a collector, thereby oxidizing the surface of the metal wherever exposed, and in regulating the degree of said oxidation, substantially as set forth.

In testimony of all which I have hereunto subscribed my name.

JOHN L. CREVELING.

Witnesses:
L. SCHEPMOES,
C. A. MCCUNE.